Dec. 28, 1926.
H. BELMONT
WELDING APPARATUS
Original Filed June 4, 1923    2 Sheets-Sheet 1
1,611,875
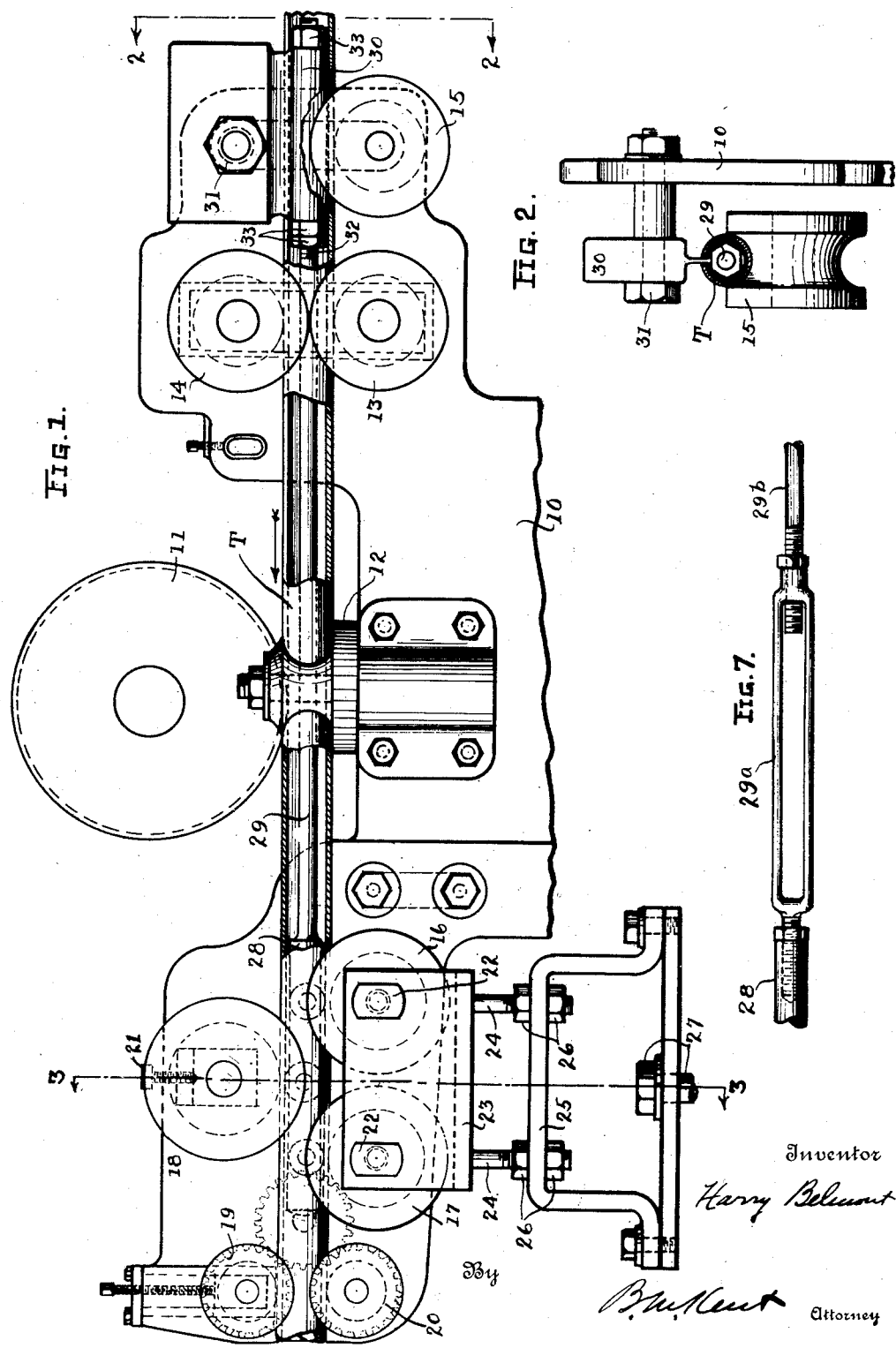

Dec. 28, 1926.
H. BELMONT
WELDING APPARATUS
1,611,875
Original Filed June 4, 1923  2 Sheets-Sheet 2
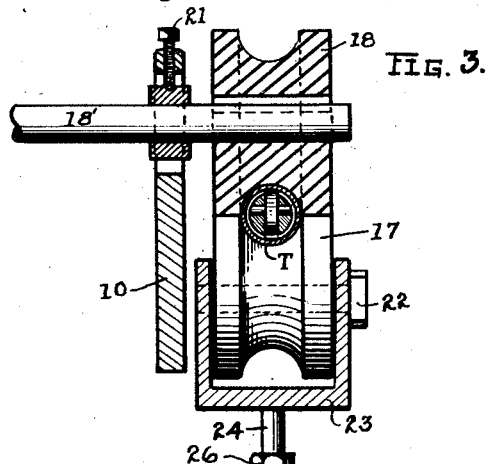
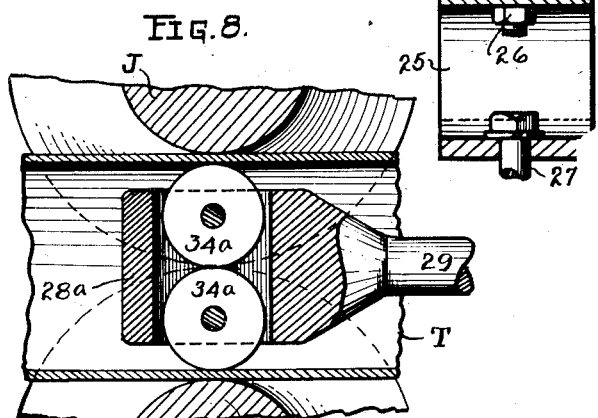
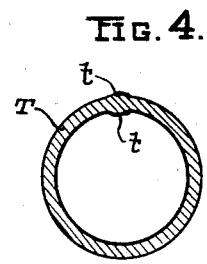
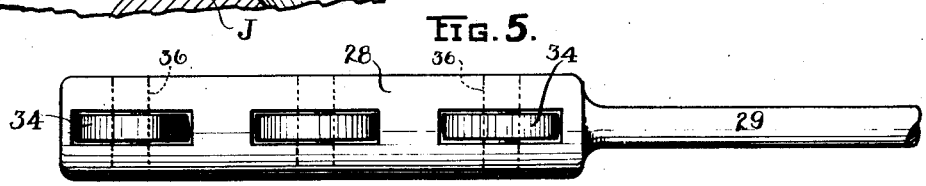
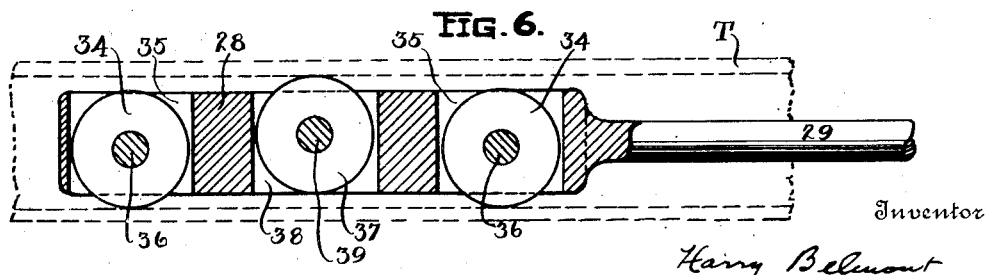
Inventor
Harry Belmont
By
Attorney Patented Dec. 28, 1926.

1,611,875

UNITED STATES PATENT OFFICE.

HARRY BELMONT, OF CLEVELAND, OHIO, ASSIGNOR, BY DIRECT AND MESNE ASSIGNMENTS, TO THE ELYRIA IRON AND STEEL COMPANY, OF CLEVELAND, OHIO, A CORPORATION OF OHIO.

WELDING APPARATUS.

Application filed June 4, 1923, Serial No. 643,172. Renewed September 15, 1926.

This invention relates to welding apparatus and more particularly to seam-welding and has to do primarily with the smoothing out of the weld so as to obliterate any burrs that may have resulted from the welding operation.

It is the object of the invention to provide means for smoothing out the weld that will be adapted for use with the so-called continuous welding machines such as are commonly used for welding the longitudinal seam of tubing formed from strip metal.

A further object of the invention is to provide a device for the purpose specified that will be of simple construction and capable of operating on the inside as well as on the outside of a tube or, in other words, on both sides of the weld, immediately after the welding operation and while the metal is still hot and comparatively soft.

Other objects and the features of novelty will be apparent from the following description taken in connection with the accompanying drawings in which:

Figure 1 illustrates, somewhat diagrammatically, a side elevation of a portion of an electric tube welding machine, embodying my invention;

Fig. 2 is a transverse section on the line 2—2 of Fig. 1;

Fig. 3 is a transverse section on the line 3—3 of Fig. 1;

Fig. 4 is a transverse section of a tube to indicate the condition of the seam immediately after the welding operation;

Fig. 5 is a plan view of a special mandrel forming part of my invention;

Fig. 6 is a longitudinal section of the same;

Fig. 7 is a plan view of a modified form of rod for holding the mandrel; and

Fig. 8 is a longitudinal section through a modified form of mandrel for tubes of relatively large size.

Referring to the drawings, it may be said that Fig. 1 illustrates a portion of a machine of the type shown and described in the Parpart Patent 658,741, the view being similar to that of Fig. 4 of said patent. While I have shown, for the purpose of illustrating the principles of my invention, a welding machine of the type illustrated in the Parpart patent, it will be understood that the invention may be applied to other types of welding machines wherein the welding is either performed by electricity or by oxy-acetylene gas or any equivalent means.

In Fig. 1, 10 indicates a portion of the frame of the machine, 11 one of the contact rolls for supplying electricity to make the weld and 12 one of the pressure rolls for forcing the edges of the seam into intimate contact. In the Parpart machine, above referred to, there are two of the rolls 11, on opposite sides of the seam, and two of the rolls 12. The rolls 13 and 14 feed in the tube, to be welded, and the roll 15 acts as a guide roll. In place of the two draft rolls J of the Parpart patent, I employ the three rolls 16, 17 and 18, the latter roll being, in all respects, the equivalent of the upper roll J shown in the patent and being positively driven by the shaft 18' which is driven by any suitable gearing such as is shown in the patent. The rolls 19 and 20 are similar in function to the rolls M' of the Parpart patent. The roll 18 is vertically adjustable to and from the tube by means of the screw 21, as in the Parpart patent. The tube, in the drawings, is indicated at T and moves in the direction of the arrow.

The rolls 16 and 17 are rotatably mounted on spindles 22 which are supported in the U-shaped frame 23. The frame 23 is carried on studs 24 which are secured to a bracket 25 by means of the nuts 26. The bracket 25 may be secured to the frame of the welding machine or any suitable support by means of the bolts 27, and the studs 24 and nuts 26 provide for the adjustment of the frame 23, together with the rolls 16 and 17, to and from the tube T.

Arranged within the tube T is a mandrel or carriage 28 which is secured to the end of a rod 29 and the latter is secured to a bracket 30 which projects through the open seam of the tube T and is secured to the frame 10 of the machine by one or more bolts 31. The end of the rod 29, which engages with the bracket 30, is threaded as indicated at 32, and the position of the carriage 28, longitudinally of the tube, may be adjusted by means of the nuts 33, as will be obvious from Fig. 1. The rod 29 extends from the bracket 30 through the tube to a point adjacent the roll 16, and the carriage 28 has, at its opposite ends, wheels or rollers 34 which run on the interior of the tube and thus support the carriage. The carriage 28 may be of cylindrical form, slightly smaller than the internal diameter of the tube, and the wheels 34 are arranged in slots 35 in the carriage and supported on the pins 36. The distance between the axes of the wheels 34 is substantially the same as the distance between the axes of the rolls 16 and 17, and the carriage 28 is so positioned in the tube that the wheels 34 and rolls 16 and 17 are in alignment, as shown in Fig. 1.

On the carriage 28 there is a roller 37 which is preferably arranged midway between the wheels 34, in a slot 38 and rotatably supported on a pin 39. From Fig. 6 it will be observed that the wheels 34 project below the carriage 28 whereas the roller 37 projects above the carriage and is adapted to contact with the inner surface of the tube (see Fig. 3). This arrangement brings the roller 37 in vertical alignment with the roll 18 and the latter, which presses on the external surface of the tube, cooperates with the roller 37 to roll down any burrs, such as shown at $t$ in Fig. 4, that may be on the inside or outside of the tube. From Fig. 1 it will be seen that the pressure of the roll 18 will be transmitted through the roller 37 to the carriage 28 and from the latter, through the wheels 34 and the portion of the tube opposite the welded seam, to the rolls 16 and 17. The rolls 16 and 17, being rigidly supported, therefore enable the roll 18 and the roller 37 to exert the necessary pressure on the weld to roll down the burrs. The peripheries of the rollers 34 and 37 will be turned to conform to the interior of the tube. It should also be borne in mind that the welded portion of the tube will still be hot by the time it reaches the roll 18 and hence the metal will be soft enough to permit the rolling down of the burr without liability of injuring the weld.

The rolling of the weld, as above described, also has the advantage of working the metal while hot and thereby results in a weld of more homogeneous structure. By using a relatively large roller 37, that is, compared to the internal diameter of the tube, I have found that I am not troubled with the roller sticking from overheating or otherwise and the heat which is transmitted to the roller, from the hot weld with which it contacts seems to be effectively dissipated and the device operates efficiently for long periods at a time.

In Fig. 7 there is illustrated a modification of the rod 29 shown in Fig. 1, the modification consisting in using an open link 29$^a$ in place of the solid rod through the welding zone. This link has a threaded connection at one end with the mandrel or carriage 28 and at the other end with the rod 29$^b$ which is connected to the bracket 30. The open link 29$^a$ permits the sparks which are formed in the welding operation to pass through and lodge on the opposite side of the tube and carried along therewith. With a solid rod such as 29 these sparks have a tendency to accumulate on the rod and thus build up a mass which is liable to cause trouble upon becoming detached and being carried along by the tube and then jamming between the mandrel and tube which results in either stopping the tube or carrying away the mandrel.

In Fig. 8, I have illustrated a form of mandrel suitable for use for large size tube, in which case the rolls J, J of the Parpart patent may be employed instead of the three rolls 16, 17 and 18 of Fig. 1. In Fig. 8, the mandrel or carriage 28$^a$ carries two rollers 34$^a$, which are arranged in alignment with the rolls J, J and have their adjacent sides in contact so that the pressure is transmitted directly from one roller to the other. I have found that this arrangement is suitable for use with large size tube because it is then possible to have the rollers 34$^a$ large enough in size to prevent "sticking". If the rollers 34$^a$ "stick" or, in other words are prevented from rotating they drag on the inside of the tube and tend to scratch the inner surface of the tube and thus weaken it and render it unsuited to some purposes.

Having thus described my invention, what I claim is:

1. In apparatus of the class described, the combination of means for heating the edges of a seam to be welded, pressure means for forcing said edges together to produce a weld, and rolls having relatively fixed axes arranged to operate on opposite sides of the weld to smooth down the burrs produced in making the weld.

2. In apparatus of the class described, the combination of means for heating the longitudinal edges of a tube to be welded, means for forcing said edges together to produce a weld, a carriage arranged inside the tube and having rotatable supporting means engaging the surface of the tube opposite the weld, supporting means for the tube opposed to said rotatable supporting means, a roller on said carriage for operating on the weld to smooth down the interior burr, a roll on the exterior of the tube opposed to said roller and operating on the weld to smooth down the exterior burr, and means for holding said carriage in the desired position.

3. In apparatus of the class described, the combination of means for heating the longitudinal edges of a tube to be welded, means for forcing said edges together to produce a weld, a carriage arranged inside the tube and having supporting wheels that run on the internal surface of the tube, a roller on said carriage between said wheels for operating on the weld to smooth down the interior burrs, rolls on the outside of the tube opposed to said wheels and roller, and means for holding said carriage in the desired position.

4. In tube welding apparatus, the combination of means for heating the longitudinal edges of the tube to be welded, means for forcing said edges together to produce a weld thereby forming burrs on the surfaces of the tube, a carriage arranged inside the tube and having supporting wheels that run on the internal surface of the tube, a roller rotatably mounted on said carriage and having a diameter slightly less than the bore of the tube, and external rolls opposed to said wheels and said roller, said roller and the roll opposed thereto operating on the welded seam of the tube to smooth out any external or internal burrs.

5. In tube welding apparatus, means for heating the edges to be welded, means for moving the tube in the direction of its axis, and a pair of rolling elements having relatively fixed axes one of said elements being inside the tube which extend transversely of the tube, and the other outside, said elements cooperating to squeeze the welded seam between them as the tube moves in the direction of its axis and thereby smooth out any internal or external burrs on the tube.

6. In apparatus of the class described, the combination of means for welding the longitudinal seam of a tube, a mandrel within the tube for smoothing down any burrs formed in the welding operation, a holder for said mandrel extending longitudinally of the tube to a point in advance of the welding means, a bracket projecting through the seam of the tube and to which said holder is attached, and said holder having a longitudinally extending opening therein in the region of said welding means permitting the passage of sparks therethrough and thereby avoiding detrimental accumulations on said holder.

In testimony whereof I affix my signature.

HARRY BELMONT.